United States Patent [19]

Asanuma et al.

[11] Patent Number: 5,082,893
[45] Date of Patent: Jan. 21, 1992

[54] POLYOLEFIN RESIN COMPOSITIONS AND APPLICATIONS THEREOF

[75] Inventors: Tadashi Asanuma; Kazuhiko Yamamoto; Mitsuru Ito; Kaoru Kawanishi, all of Takaishi, Japan

[73] Assignee: Mitsui Toatsu Chemicals, Inc., Tokyo, Japan

[21] Appl. No.: 405,300

[22] Filed: Sep. 11, 1989

[30] Foreign Application Priority Data

| Sep. 16, 1988 | [JP] | Japan | 63-229844 |
| Dec. 12, 1988 | [JP] | Japan | 63-311873 |
| Dec. 12, 1988 | [JP] | Japan | 63-311874 |
| Dec. 21, 1988 | [JP] | Japan | 63-320591 |
| Jan. 19, 1989 | [JP] | Japan | 1-8498 |
| Jan. 19, 1989 | [JP] | Japan | 1-8499 |
| Feb. 16, 1989 | [JP] | Japan | 1-34994 |
| Mar. 6, 1989 | [JP] | Japan | 1-52055 |
| May 19, 1989 | [JP] | Japan | 1-24265 |
| Jun. 29, 1989 | [JP] | Japan | 1-165401 |

[51] Int. Cl.$^5$ ............................................. C08L 41/00
[52] U.S. Cl. ............................ 524/547; 524/418; 524/423; 524/425; 524/447; 524/449; 524/451; 524/504; 526/279
[58] Field of Search .............. 524/504, 418, 423, 425, 524/447, 451, 547; 526/279

[56] References Cited

U.S. PATENT DOCUMENTS

| 3,650,810 | 3/1972 | Marzocchi | 524/547 |
| 4,663,369 | 5/1987 | Kawai et al. | 523/203 |
| 4,711,913 | 12/1987 | Tateosian et al. | 522/14 |
| 4,722,961 | 2/1988 | Topcik | 524/504 |

Primary Examiner—Kriellion S. Morgan
Assistant Examiner—Edward Cain
Attorney, Agent, or Firm—Burns, Doane, Swecker & Mathis

[57] ABSTRACT

The present invention provides polyolefin resin compositions, comprising (i) a polymer containing an alkenylsilane compound and an inorganic filler and (ii) a polyolefin compound which provide molded articles having excellent Izod impact strength, tensile yield strength and stiffness and are also useful for the production of surface-coated molded articles.

21 Claims, No Drawings

POLYOLEFIN RESIN COMPOSITIONS AND APPLICATIONS THEREOF

BACKGROUND OF THE INVENTION a) Field of the Invention

The present invention relates to polyolefin resin compositions comprising a polymer containing an inorganic filler and an alkenylsilane and a polyolefin, and to applications thereof.

b) Description of the Related Art

Polyolefins are economical polymers having relatively well-balanced physical properties. It has been widely known to incorporate one or more inorganic fillers into polyolefins to further improve their physical properties, such as stiffness and heat resistance.

However, their physical properties cannot be improved to a significant extent by the incorporation of such inorganic fillers. To the contrary, the incorporation of such inorganic fillers results in reduced impact resistance, thereby failing to provide molded articles having satisfactory physical properties.

As a method for solving these problems, it has been proposed to treat a filler with a coupler, or to blend a polymer containing a grafted polar monomer such as maleic anhydride, into a polyolefin (see, for example, Japanese Patent Application Laid-Open Nos. 149452/1981, 45249/1983 and 64647/1984). However, the mere treatment of a filler with a coupler cannot bring about sufficient improvements in physical properties. On the other hand, blending a polymer containing a polar monomer such as maleic anhydride grafted thereon leads to a higher production cost and moreover cannot bring about sufficient improvements in physical properties. There has hence been a demand for the development of filler-containing polyolefin resin compositions of improved physical properties.

SUMMARY OF THE INVENTION

The present invention overcomes the problems and disadvantages of the prior art by providing polyolefin resin compositions that exhibit superior stiffness, impact and yield strength properties than prior art polyolefin compositions.

It is an object of the invention to provide polyolefin resin compositions whose physical properties, such as impact resistance, will not be compromised by the incorporation of a large amount of an inorganic filler.

It is a further object of the invention to provide polyolefin resin compositions that are useful for the production of surface-coated molded articles.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a polyolefin resin composition comprising (i) a polymer containing an inorganic filler and an alkenylsilane, and (ii) a polyolefin.

The invention also provides a polyolefin resin composition obtained by treating a starting polyolefin resin composition comprising (i) a polymer containing an inorganic filler and an alkenylsilane and (ii) a polyolefin, under conditions such that silanol bonds are formed.

The invention further provides a polyolefin resin composition obtained by exposing a starting polyolefin resin composition comprising (i) a polymer containing an inorganic filler and an alkenylsilane and (ii) a polyolefin, to radiation.

The polyolefin resin compositions of the invention are useful in the preparation of molded articles that are to be surface coated.

DETAILED DESCRIPTION OF THE INVENTION

Reference will now be made in detail to the present preferred embodiments of the invention.

An alkenylsilane-containing polymer for use in the invention can be prepared by either polymerizing an alkenylsilane and an olefin in the presence of a transition metal compound and an organometal compound or graft-polymerizing an alkenylsilane on a polyolefin. Exemplary suitable alkenylsilane-olefin copolymers for use in the invention are disclosed in U.S. Pat. No. 3,223,686. Preferably, copolymers having a relatively low alkenylsilane content are employed in the present invention.

Exemplary suitable alkenylsilane compounds for use in the invention include compounds that contain at least one Si-H bond, for example, compounds represented by the following formula:

wherein n is from 0 to 12, p is from 1 to 3, and R represents a $C_{1-12}$ hydrocarbon residual group. Exemplary compounds include vinylsilane, allylsilane, butenylsilane and pentenylsilane compounds as well as compounds formed by substituting a hydrocarbon residue such as a methyl or phenyl group for one or two hydrocarbon atoms of the Si-H groups or by substituting a chlorine atom for one, two or three hydrogen atoms of the Si-H groups in each molecule of the alkenylsilane compound.

Exemplary suitable olefin compounds for use in the invention include $C_{2-12}$ olefins, such as ethylene, propylene, butene-1, pentene, hexene-1, octene-1, 4-methylpentene-1 and 3-methylpentene-1.

In the invention, the copolymer of the olefin and alkenylsilane compounds can be prepared by polymerizing the compounds in the presence of a catalyst comprising a transition metal compound and an organometal compound. An exemplary suitable catalyst is described in U.S. Pat. No. 3,223,686 which is formed of $TiCl_3$ and triethylaluminum. Preferably, a catalyst which exhibits high activity and can afford highly stereoscopic polyolefins is employed, such as a catalyst comprising titanium halide and an organoaluminum compound. Exemplary suitable catalyst include a compound obtained by reducing titanium tetrachloride with metallic aluminum, hydrogen or an organoaluminum compound and then modifying the resultant titanium trichloride with an electron donor and an organoaluminum compound, which optionally includes an electron donor compound such as an oxygen-containing organic compound; a transition metal compound catalyst obtained by carrying a titanium halide on a carrier such as magnesium halide or on a carrier obtained by treating the carrier with an electron donor compound and an organoaluminum compound, which optionally includes an electron donor compound such as an oxygen-containing organic compound; a transition metal compound catalyst obtained by dissolving the reaction product of magnesium halide and an alcohol in a hydrocarbon solvent and thereafter treating the reaction product with a precipitant such as titanium tetrachloride to insolubilize the reaction product in the hydrocarbon solvent, and optionally further treating with an electron donor compound such as an ester or ether and then with a titanium halide and an organoaluminum compound, which optionally includes an electron donor compound such as an oxygen-containing organic compound. Various exemplary catalyst systems are disclosed in Zieglar-Natta Catalysts and Polymerization by John Boor, Jr. (Academic Press), Journal of Macromolecular Science Reviews in Macromolecular Chemistry and Physics, C24(3) 355-385 (1984), ibid. C25(1) 578-597 (1985), the pertinent disclosures of which are incorporated herein by reference.

Exemplary suitable electron donor compounds for use in the invention generally include oxygen-containing compounds such as ethers, esters, orthoethers, and alkoxy-silicon compounds, and alcohols, aldehydes, and water.

The organoaluminum compound is preferably selected from the group consisting of trialkylaluminum, dialkylaluminum halide, alkylaluminum sesquihalide and alkylaluminum dihalide compounds. The alkyl groups of these compounds are preferably selected from the group consisting of methyl, ethyl, propyl, butyl and hexyl groups. The halide groups of the compounds are preferably selected from the group consisting of chlorine, bromine and iodine groups.

No particular limitation is imposed on the molar ratio of the alkenylsilane compound to the olefin compound to be polymerized. In view of the mixing of an alkenylsilane olefin copolymer into the polymer, however, preferably the alkenylsilane is present in an amount of from about 0.001 mol % to about 30 mol %, more preferably from about 0.1 mol % to about 10 mol % of the polymer.

Polymerization is generally carried out by a solvent process in which an inert solvent is used. However, a bulk polymerization or vapor-phase polymerization process may also be employed.

Generally, polymerization is conducted at a temperature of from about 0° C. to about 200° C. under a pressure of from about atmospheric pressure to about 150 kg/cm$^2$, preferably at from about 25° C. to about 150° C. under a pressure of from about atmospheric pressure to about 100 kg/cm$^2$.

Although no particular limitation is imposed on the molecular weight of the polymer, it is preferable that the molecular weight of the polymer be similar to or lower than the molecular weight of the polyolefin in which the alkenylsilane is mixed to improve the physical properties. In some instances, the polymerization may be conducted to obtain similar composition, molecular weight, other properties to a crystalline polyolefin except for the inclusion of the alkenylsilane.

Graft polymerization is usually carried out by decomposing a radical-forming agent such as a peroxide in the presence of the polyolefin and alkenylsilane. The preferred graft ratio of the alkenylsilane in this process is similar to that described above for polymerization.

As the polyolefin use in the production of the resin composition according to this invention, a crytalline polyolefin is preferred from the standpoint of stiffness.

It is possible to use not only homopolymers of ethylene, propylene, butene-1, 3-methylbutene-1 and 4-methylpentene-1 as well as copolymers obtained by polymerizing these polylefins with small amounts of other olefins such as hexene-1 or octene-1. Exemplary suitable polyolefins also include block copolymers produced by first polymerizing an olefin singly or copolymerizing the olefin with a small amount of another olefin and then copolymerizing the resultant homopolymer or copolymer with ethylene, propylene or another α-olefin. In general, the proportion of the additional olefin to be copolymerized is about 10 wt. % or less in the case of random polymerization and about 50 wt. % or less in the case of block polyerization. Such production processes are known and a variety of polyolefins are available under their respective trade names on the market. The polyolefin can also be produced in a manner similar to the above-described production of the polymer from an olefin and alkenylsilane except for the omission of the alkenylsilane.

With respect to the mixing ratio of the polymer of alkenylsilane and olefin or the polymer obtained by grafting the alkenylsilane on the polyolefin, it is generally preferred to mix at least about 0.01 part by 5 weight of the polymer to about 100 parts by weight of polyolefin, although it varies depending on the below-described proportion of the filler to be mixed. Proportions smaller than about 0.01 part by weight of the polymer are too small to significantly improve the physical properties. With respect to the upper limit, there are no substantial differences in the physical properties of a polyolefin obtained by conducting similar polymerization except for the omission of the alkenylsilane and another polyolefin obtained by copolymerizing the alkenylsilane in a small proportion. About 10 parts by weight is therefore preferred as the upper limit in view of production cost and moldability.

No particular limitation is imposed on the inorganic filler for use in the invention. Various fillers conventionally used for the improvement of physical properties of polyolefins are suitable for use in the invention, including talc, kaolin, mica, calcium carbonate, calcium silicate, calcium sulfate, calcium sulfite, and glass fibers. No particular limitation is imposed on the particle size, shape and the like of these fillers. Fillers of various particle sizes and shapes can be used selectively depending on the desired end use. Further, filler surfaces may be treated with a coupler of the silane or titanium type prior to use. The proportion of the inorganic filler in the whole composition can be determined in accordance with the desired end use. Generally, the amount of inorganic filler ranges from about 5 parts by weight to about 90 parts by weight per 100 parts by weight of the whole composition.

No particular limitation is imposed on the manner of mixing the above described respective components. Further, conventional additives may be added as desired, such as antioxidants, ultraviolet absorbers, lubricants, antistatic agents and/or nucleating agents. The components can be prepared into a composition by first mixing in a Henschel mixer, twin-cylinder mixer or the like and then mixing in a molten state by an extruder, rolls, Banbury mixer, kneader or the like.

The physical properties of the resin composition of the invention can be improved further by treatment under conditions such that silanol bonds can be formed. The resin composition can be treated with water, a $C_{1-12}$ monohydric or polyhydric alcohol or the like in the presence of a catalyst, or by subjecting the resin composition to heat treatment in the presence of oxygen. Exemplary suitable catalysts include alkoxides of alkali metals or alkaline earth metals, organic acids and salts thereof, organic bases and noble metal catalysts. When a catalyst is employed, it is more 5 effective to mix the catalyst in advance upon production of the composition. Heat treatment of the resin composition is conducted at a temperature below the heat distortion temperature of a resulting molded article, usually at 100° C. or lower.

Exemplary alcohols suitable for treating the resin composition of the invention include monohydric alcohols such as methanol, ethanol, propanol, butanol and pentanol; dihydric alcohols such as ethylene glycol and propylene glycol and polymers and derivatives thereof; glycerin and polymers and derivatives thereof.

The physical properties of the resin composition of the invention can also be improved by exposure to radiation, for example, rays, $\alpha$ rays, $\beta$ rays, $\gamma$ rays, X rays, neutron radiation and electron radiation. Among these, $\gamma$ rays and electron radiation are preferably employed. With respect to the irradiation level, irradiate is usually carried out at from about several tens of rads to about several tens of Mrad. Irradiation levels beyond the upper limit would not bring about any particular additional beneficial effects. On the other hand, irradiation levels below the lower limit would bring about no appreciable beneficial effects. No particular limitation is imposed on the temperature upon irradiation. Any temperature may be employed as long as it is not higher than the withstandable maximum temperature of the polyolefin. Room temperature is generally sufficient. When molding is conducted after exposure to radiation, it is preferable from the standpoint of moldability to limit the irradiation level to a relatively low level.

Resin compositions according to this invention are suitable as materials for molded articles which are to be surface-coated, for example, with a paint or the like, and are compatible with various paints. Usually, they are molded into desired shapes and then coated. Extremely good coatability is exhibited paticularly for acrylic paints.

EXAMPLES

The present invention will be further clarified by the following examples, which are intended to be purely exemplary of the invention.

EXAMPLE 1

An oscillating mill was equipped with two pots having an internal capacity of 1 l. Each pot was charged with 20 g of magnesium chloride, 6 ml of titanium tetrachloride and 7.5 ml of n-butyl phthalate. The contents were then ground for 40 hours, and then removed from the pots. Ten grams of the thus-ground mixture and 100 ml of toluene were placed in a 200-ml flask and then heated for 1 hour at the boiling point temperature of toluene. The supernatant was removed at 100° C., followed by the further addition of 100 ml of toluene. The resultant mixture was heated to 90° C., and the resulting supernatant was then removed. That procedure was repeated three times. A transition metal catalyst thus obtained contained 2.2 wt. % of titanium.

An autoclave whose internal capacity was 5 l was charged with 100 mg of the above catalyst, 1 ml of triethylaluminum and 0.03 m of phenyldimethoxymethylsilane, followed by the addition of 1.5 kg of propylene, 60 g of vinylsilane and 1.4 Nl of hydrogen. The contents were polymerized at 75° C. for 3 hours. After polymerization, unreacted monomers were removed and powder was taken out of the autoclave. It was dried and weighed. Its weight was 870 g. In addition, its intrinsic viscosity (hereinafter abbreviated as "$\eta$") as measured at 135° C. in the form of a tetralin solution was 1.72, and the percentage of its extraction residue (hereinafter abbreviated as "II") when extracted for 6 hours in boiling n-heptane was 97.0%. Further, the content of vinylsilane calculated from the amount of silicon was 1.4 mol %.

To 100 parts by weight of a propylene-ethylene block copolymer having an ethylene content of 7.5 wt. %, were added 5 parts by weight of the above copolymer and 30 parts by weight of an inorganic filler which had been obtained in advance by treating white mica ("CLALITE MICA 300w", trade name; product of Kuraray Co., Ltd.) with 3-aminopropyltriethoxysilane in water and then thoroughly drying the thus-treated white mica. The resultant mixture was then kneaded and pelletized by an extruder. A pressed sheet 2 mm thick was formed from the pellets and its physical properties were measured.

| | |
|---|---|
| Flexural modulus, kg/cm$^2$: | ASTM D747 (23° C.) |
| Tensile yield strength, kg/cm$^2$: | ASTM D638 (23° C.) |
| Izod (notched) impact strength, kg · cm/cm$^2$: | ASTM D256 (20° C., −10° C.) |

The results are shown in Table 1.

COMPARATIVE EXAMPLE 1

The procedures of Example 1 were repeated except for the omission of the propylene-vinylsilane copolymer. The results are shown in Table 1.

EXAMPLE 2

The procedures of Example 1 were repeated except that white mica was used without being treated with 3-aminopropyltriethoxysilane in advance. The results are shown in Table 1.

EXAMPLE 3

The procedures of Example 1 were repeated except for the use of talc ("CT-8", trade name; product of Asada Milling Co., Ltd.) as an inorganic filler. The results are shown in Table 1.

EXAMPLE 4

The procedures of Example 1 were repeated except for the use of propylene homopolymer ($\eta$: 1.62, II: 96.8%) as polypropylene. The results are shown in Table 1.

COMPARATIVE EXAMPLE 2

The procedures of Example 4 were repeated except for the omission of the propylene-vinylsilane copolymer. The results are shown in Table 1.

EXAMPLE 5

The procedures of Example 1 were repeated except that a propylene-ethylene-allylsilane terpolymer ($\eta$: 1.62, II: 90.3%, ethylene content: 2.3 wt. %, allylsilane content: 0.8 mol %) was used instead of the propylene-vinylsilane copolymer. The results are shown in Table 1.

TABLE 1

| Run | Tensile yield strength | Stiffness modulus | Izod impact strength 20° C. | Izod impact strength −10° C. |
|---|---|---|---|---|
| Ex. 1 | 345 | 17500 | 4.5 | 2.8 |
| Comp. Ex. 1 | 255 | 13000 | 3.8 | 2.8 |
| Ex. 2 | 370 | 18500 | 5.5 | 3.0 |
| Ex. 3 | 320 | 15500 | 4.6 | 2.5 |
| Ex. 4 | 380 | 18500 | — | — |
| Comp. Ex. 2 | 320 | 16000 | — | — |
| Ex. 5 | 340 | 16500 | 4.4 | 2.8 |

EXAMPLE 6

An oscillating mill was equipped with four pots having an internal capacity of 4 and enclosing 9 kg of steel balls of 12 mm across. Under a nitrogen gas atmosphere, each pot was charged with 300 g of magnesium chloride, 60 ml of tetra-ethoxysilane and 45 ml of α,α,α-trichlorotoluene. The contents were then ground for 40 hours. Three hundred grams of the thus ground mixture were then placed in a 5-l flask. After adding 1.5 of titanium tetrachloride and 1.5 l of toluene, the contents were stirred at 100° C. for 30 minutes. The supernatant was then removed, followed by the further addition of 1.5 of titanium tetrachloride and 1.5 l of toluene. The resultant mixture was heated at 100° C. for 30 minutes and the supernatant was again removed. A solid thus obtained was repeatedly washed with n-hexane to obtain a transition metal catalyst in the form of a slurry. A portion of the slurry was sampled out and its titanium content was analyzed. The titanium content was 1.9 wt. %.

A glass-made pressure autoclave whose internal capacity was 200 ml was charged under a nitrogen gas atmosphere with 40 ml of toluene, 20 mg of the above transition metal catalyst, 0.128 ml of diethylaluminum chloride, 0.06 ml of methyl p-toluate and 0.20 ml of triethylaluminum, followed by the addition of 2.0 g of vinylsilane under pressure. Thereafter, propylene was charged until the pressure reached 5 kg/cm². The contents were polymerized at 70° C. for 2 hours under constant pressure. The resulting slurry was then removed, filtered and dried, thereby obtaining 43 g of powder. The intrinsic viscosity (η) of the powder thus obtained was 1.45. According to its elemental analysis, 1.2 mol % of vinylsilane units were contained.

After mixing 800 g of propylene homopolymer ("J3H-G", trade name; product of Mitsui Toatsu Chemicals, Inc.), 40 g of the above copolymer and 180 g of glass fibers ("CS-03", trade name; product of Asahi Fiber Glass Co., Ltd.) in a Henschel mixer, the resulting mass was pelletized in a molten state at 220° C. by an extruder. Physical properties were measured by the following methods.

| Flexural modulus, kg/cm²: | ASTM D638 (23° C.) |
|---|---|
| Flexural strength, kg/cm²: | ASTM D638 (23° C.) |

The results are shown in Table 2.

COMPARATIVE EXAMPLE 3

For the sake of comparison, a composition of glass fibers and polypropylene was prepared in a similar manner to Example 6 except the propylene-vinylsilane copolymer was omitted. The results are shown in Table 2.

EXAMPLE 7

Allylsilane was used upon copolymerization, thereby obtaining a polymer having an allylsilane content of 1.5 mol %, a melting point of 152° C. and an intrinsic viscosity (η) of 1.28. The polymer was tested in a similar manner to Example 6. The results are shown in Table 2.

EXAMPLE 8

The procedures of Example 6 were repeated except for the use of a block polymer ("BJHH-G", trade name; product of Mitsui Toatsu Chemicals, Inc.) in place of the propylene homopolymer. The results are shown in Table 2.

COMPARATIVE EXAMPLE 4

The procedures of Example 8 were repeated except for the vinylsilane-propylene copolymer was omitted. The results are shown in Table 2.

EXAMPLE 9

A glass-made pressure autoclave having an internal capacity of 200 ml was charged under a nitrogen gas atmosphere with 40 ml of toluene, 20 mg of the transition metal catalyst obtained in Example 6, 0.128 ml of diethylaluminum chloride, 0.06 ml of methyl p-toluate and 0.03 ml of triethylaluminum, followed by the addition of 0.5 g of vinylsilane under pressure. After stirring the contents at 20° C. for 60 minutes, 0.05 ml of triethylaluminum was added. The resulting catalyst slurry was then charged in an autoclave having an internal volume of 5 l, followed by the addition of 1.8 kg of propylene and 3.3 Nl of hydrogen. A polymerization reaction was then conducted at 75° C. for 2 hours. After the polymerization reaction, unreacted propylene was purged out and the resulting polymer was removed. The polymer was then dried at 80° C. and 60 mmHg for 12 hours. 380 g of powder were obtained (η: 1.62, II: 96.6%). The above polymerization was repeated to obtain 5 kg of powder. To 4 kg of the powder were added a phenol-type stabilizer and calcium stearate at weight ratios of 10/10,000 and 15/10,000 respectively as well as 1 kg of glass fibers of the same type as those employed in Example 6. In a similar manner to Example 6, the resulting mass was pelletized and the physical properties were tested. The results are shown in Table 2.

EXAMPLE 10

100 parts by weight of polypropylene powder (η: 1.80, II: 97.5%), 3 parts by weight of dimethyl-vinylsilane and 0.03 part by weight of dicumyl peroxide were mixed. The resultant mixture was pelletized at 240° C. through an extruder, thereby obtaining a dimethylvinylsilane-grated copolymer. According to analyses, its intrinsic viscosity (η) and dimethyl-vinylsilane contents were 1.42 and 1.2 mol %. The procedures of Example 9 were repeated except for the substitution of the copolymer for the vinylsilane-propylene copolymer. The results are shown in Table 2.

TABLE 2

| Run | Flexural modulus | Flexural strength | Izod impact strength 20° C. | Izod impact strength −10° C. |
|---|---|---|---|---|
| Ex. 6 | 19500 | 400 | — | — |
| Comp. Ex. 3 | 19300 | 280 | — | — |

TABLE 2-continued

| Run | Flexural modulus | Flexural strength | Izod impact strength 20° C. | Izod impact strength −10° C. |
|---|---|---|---|---|
| Ex. 7 | 19800 | 480 | — | — |
| Ex. 8 | 18300 | 340 | 8.5 | 2.8 |
| Comp. Ex. 4 | 17500 | 200 | 8.4 | 2.4 |
| Ex. 9 | 21300 | 460 | — | — |
| Ex. 10 | 22400 | 370 | — | — |

EXAMPLE 11

To 100 parts by weight of a propylene-ethylene block copolymer having an ethylene content of 7.5 wt. %, were added 5 parts by weight of the copolymer obtained in Example 1, 30 parts by weight of an inorganic filler which had been obtained in advance by treating white mica ("CLALITE MICA 300w", trade name; product of Kuraray Co., Ltd.) with 3-aminopropyltriethoxysilane in water-ethanol and then thoroughly drying the thus-treated white mica, and 0.01 part by weight of butyl tinlaurate as a catalyst for forming silanol bonds. The resultant mixture was then kneaded and pelletized by an extruder. The physical properties of the thus-obtained composition, were measured. The results are shown in Table 3.

COMPARATIVE EXAMPLE 5

The procedures of Example 11 were repeated except that the propylene-vinylsilane copolymer was omitted. The results are shown in Table 3.

EXAMPLE 12

The procedures of Example 11 were repeated except that white mica was not treated with 3-aminopropyltriethoxysilane in advance. The results are shown in Table 3.

EXAMPLE 13

The procedures of Example 11 were repeated except that talc ("CT-8", trade name; product of Asada Milling Co., Ltd.) was employed as an inorganic filler and potassium butoxide was employed as a catalyst. The results are shown in Table 3.

EXAMPLE 14

The procedures of Example 11 were repeated except that propylene homopolymer ($\eta$: 1.62, II: 96.8%) was employed as polypropylene. The results are shown in Table 3.

COMPARATIVE EXAMPLE 6

The procedures of Example 14 were repeated except that the propylene-vinylsilane copolymer was omitted. The results are shown in Table 3.

EXAMPLE 15

The procedures of Example 11 were repeated except that a propylene-ethylene-allylsilane terpolymer ($\eta$: 1.62, II: 90.3%, ethylene content: 2.3 wt. %, allylsilane content: 0.8 mol %) was used instead of the propylene-vinylsilane copolymer. The results are shown in Table 3.

TABLE 3

| Run | Tensile yield strength | Flexural modulus | Izod impact strength 23° C. | Izod impact strength −10° C. |
|---|---|---|---|---|
| Ex. 11 | 360 | 17500 | 5.0 | 3.2 |
| Comp. Ex. 5 | 255 | 13000 | 3.8 | 2.8 |
| Ex. 12 | 375 | 18500 | 5.6 | 3.2 |
| Ex. 13 | 330 | 15500 | 4.9 | 3.1 |
| Ex. 14 | 385 | 18500 | — | — |
| Comp. Ex. 6 | 320 | 16000 | — | — |
| Ex. 15 | 350 | 16500 | 4.6 | 3.1 |

EXAMPLE 16

An autoclave whose internal capacity was 5 l was charged under a nitrogen gas atmosphere with 20 mg of the transition metal catalyst obtained in Example 1, 0.06 ml of triethylaluminum and 0.03 ml of trimethoxyphenylsilane. 1.8 kg of propylene were charged further, followed by the addition of 3.3 Nl of hydrogen. A polymerization reaction was then conducted at 75° C. for 20 minutes, and 10 g of vinylsilane were then added under pressure, followed by further polymerization for 1 hour and 30 minutes. After completion of the reaction, unreacted propylene was purged out, and ethylene and propylene were added and polymerized at 50° C. for 30 minutes in the presence of the resultant polypropylene. The partial pressures of propylene and ethylene were 15 kg/cm² and 7 kg/cm² respectively. Hydrogen was added in an amount of 0.2 Nl. After polymerization, unreacted gases were purged out and the content was removed and dried to obtain 590 g of a copolymer.

The intrinsic viscosity ($\eta$) and ethylene content of the copolymer thus obtained were 2.12 dl/g and 8.2 wt. % respectively. It contained 0.01 mol % of vinylsilane.

To 100 parts by weight of the copolymer, were added 30 parts by weight of an inorganic filler which had been obtained in advance by treating white mica ("CLALITE MICA 300w", trade name; product of Kuraray Co., Ltd.) with 3-aminopropyltriethoxysilane in water-ethanol and then thoroughly drying the thus-treated white mica. The resultant mixture was then kneaded and pelletized by an extruder. With respect to the composition thus obtained, physical properties were measured in a similar manner to Example 1. The results are shown in Table 4.

COMPARATIVE EXAMPLE 7

A block copolymer having an ethylene content of 8.0 wt. % was obtained in a similar manner to Example 16 except that vinylsilane was not used and the polymerization time was changed to 1 hour and 30 minutes in the polymerization of propylene in the former stage and the time of copolymerization with ethylene was changed to 25 minutes to give substantially the same ethylene content. The procedures of Example 16 were repeated except for the use of the block copolymer. The results are shown in Table 4.

EXAMPLE 17

The procedures of Example 16 were repeated except that white mica was not treated with 3-aminopropyltriethoxysilane in advance. The results are shown in Table 4.

EXAMPLE 18

The procedures of Example 16 were repeated except for the use of talc ("CT-8", trade name; product of Asada Milling Co., Ltd.) as an inorganic filler. The results are shown in Table 4.

EXAMPLE 19

A block copolymer having an intrinsic viscosity ($\eta$) of 1.76, an ethylene content of 12.5 wt. % and a vinylsilane content of 0.01 mol % was obtained in a similar manner to Example 16 except that the initial copolymerization of propylene and vinylsilane was conducted for 2 hours using 1.8 kg of propylene, 10 g of vinylsilane and 5.8 Nl of hydrogen and the ethylene partial pressure was controlled at 10 kg/cm² upon copolymerization. The procedures of Example 16 were repeated except for the use of the block copolymer. The results are shown in Table 4.

COMPARATIVE EXAMPLE 8

A block copolymer having an ethylene content of 12.8 wt. % was obtained by conducting the former-stage copolymerization of propylene and vinylsilane without using vinylsilane and setting the polymerization time of the former stage at 1 hour and 25 minutes to give the same ethylene content. The procedures of Example 16 were repeated except for the use of the block copolymer. The results are shown in Table 4.

EXAMPLE 20

A copolymer having an intrinsic viscosity ($\eta$) of 2.07, an ethylene content of 7.4 wt. % and an allyl-silane content of 0.01 mol % was obtained in a similar manner to Example 1 except that allylsilane was employed in lieu of vinylsilane upon copolymerization of propylene and vinylsilane in the former stage. The procedures of Example 16 were repeated except for the use of the copolymer. The results are shown in Table 4.

TABLE 4

| Run | Tensile yield strength | Flexural modulus | Izod impact strength | |
|---|---|---|---|---|
| | | | 20° C. | −10° C. |
| Ex. 16 | 375 | 19500 | 3.7 | 2.9 |
| Comp. Ex. 7 | 250 | 12500 | 3.6 | 2.6 |
| Ex. 17 | 365 | 19000 | 3.9 | 3.1 |
| Ex. 18 | 350 | 17000 | 4.1 | 3.0 |
| Ex. 19 | 350 | 18000 | 6.5 | 4.3 |
| Comp. Ex. 8 | 235 | 15000 | 6.3 | 4.1 |
| Ex. 20 | 365 | 18500 | 4.2 | 3.4 |

EXAMPLE 21

An autoclave whose internal capacity was 5 l was charged under a nitrogen gas atmosphere with 20 mg of the transition metal catalyst obtained in Example 1, 0.06 ml of triethylaluminum and 0.03 ml of trimethoxyphenylsilane. 1.8 kg of propylene were charged further, followed by the addition of 3.3 Nl of hydrogen. A polymerization reaction was then conducted at 75° C. for 1 hour. After completion of the reaction, unreacted propylene was purged out, and ethylene, propylene and vinylsilane were added and polymerized at 50° C. for 20 minutes in the presence of the resultant polypropylene. The partial pressures of propylene and ethylene were 15 kg/cm² and 7 kg/cm² respectively. Vinylsilane was added in an amount of 5 g while hydrogen was added in an amount of 0.2 Nl. After the polymerization, unreacted gases were purged out and the content was removed and dried to obtain 630 g of a copolymer. The intrinsic viscosity ($\eta$) and ethylene content of the copolymer thus obtained were 2.05 d/g and 7.8 wt. % respectively. It contained 0.01 mol % of vinylsilane.

To 100 parts by weight of the copolymer, were added 30 parts by weight of an inorganic filler which had been obtained in advance by treating white mica ("KURALITE MICA 300w", trade name; product of Kuraray Co., Ltd.) with 3-aminopropyltriethoxysilane in water-ethanol and then thoroughly drying the thus-treated white mica. The resultant mixture was then kneaded and pelletized by an extruder. The physical properties of the composition thus obtained were measured in a manner similar to Example 1. The results are shown in Table 5.

COMPARATIVE EXAMPLE 9

A block copolymer having an ethylene content of 7.6 wt. % was obtained by conducting polymerization in a manner similar to Example 1 except that in the copolymerization stage no vinylsilane was used and the polymerization time was set at 15 minutes to give substantially the same ethylene content. The procedures of Example 21 were repeated except for the use of the block copolymer. The results are shown in Table 5.

EXAMPLE 22

The procedures of Example 21 were repeated except that white mica was not treated with 3-aminopropyltriethoxysilane in advance. The results are shown in Table 5.

EXAMPLE 23

The procedures of Example 21 were repeated except for the use of talc ("CT-8", trade name; product of Asada Milling Co., Ltd.) as an inorganic filler. The results are shown in Table 5.

EXAMPLE 24

A block copolymer having an intrinsic viscosity ($\eta$) of 1.86, an ethylene content of 12.5 wt. % and a vinylsilane content of 0.010 mol % was obtained in a similar manner to Example 21 except that the initial homopolymerization of propylene was conducted by using 5.8 Nl of hydrogen and the ethylene partial pressure was controlled at 10 kg/cm² upon copolymerization. The procedures of Example 21 were repeated except for the use of the block copolymer. The results are shown in Table 5.

COMPARATIVE EXAMPLE 10

A block copolymer having an ethylene content of 12.4 wt. % was obtained by omitting vinylsilane in the copolymerization stage and setting the copolymerization time to 16 minutes to give the same ethylene content. The procedures of Example 21 were repeated except for the use of the block copolymer. The results are shown in Table 5.

EXAMPLE 25

A copolymer having an intrinsic viscosity ($\eta$) of 2.12, an ethylene content of 7.3 wt. % and an allyl-silane content of 0.01 mol % was obtained in a similar manner to Example 1 except that allylsilane was employed in lieu of vinylsilane in the copolymerization stage. The procedures of Example 21 were repeated except for the use of the copolymer. The results are shown in Table 5.

TABLE 5

| Run | Tensile yield strength | Flexural modulus | Izod impact strength 20° C. | Izod impact strength −10° C. |
|---|---|---|---|---|
| Ex. 21 | 365 | 19000 | 4.8 | 3.4 |
| Comp. Ex. 9 | 255 | 13000 | 3.8 | 2.8 |
| Ex. 22 | 360 | 18500 | 5.1 | 3.6 |
| Ex. 23 | 340 | 16500 | 4.8 | 3.2 |
| Ex. 24 | 330 | 17500 | 6.8 | 4.5 |
| Comp. Ex. 10 | 245 | 14500 | 6.6 | 4.2 |
| Ex. 25 | 360 | 18000 | 4.6 | 3.6 |

EXAMPLE 26

An autoclave whose internal capacity was 5 l was charged with 100 mg of the catalyst obtained in Example 1, 1 ml of triethylaluminum and 0.03 ml of phenyldimethoxymethylsilane, followed by the addition of 1.5 kg of propylene, 60 g of vinylsilane and 5 Nl of hydrogen. Ethylene was then added to raise the internal pressure to 5 kg/cm$^2$ at 50° C. While adding ethylene to maintain the partial pressure of ethylene constant, the contents were polymerized at 50° C. for 1 hour. After the polymerization, unreacted monomers were removed and powder was taken out of the autoclave. It was dried and weighed. Its weight was 360 g. In addition, its intrinsic viscosity ($\eta$) was 1.68 and its ethylene content was 42 wt. %. Further, the content of vinylsilane calculated from the amount of silicon was 1.1 mol %.

To 100 parts by weight of a propylene-ethylene block copolymer having an ethylene content of 7.5 wt. %, were added 5 parts by weight of the above copolymer and 30 parts by weight of an inorganic filler which had been obtained in advance by treating white mica ("CLALITE MICA 300w", trade name; product of Kuraray Co., Ltd.) with 3-aminopropyltriethoxysilane in water-ethanol and then thoroughly drying the thus-treated white mica. The resultant mixture was then kneaded and pelletized by an extruder. The physical properties of the composition thus obtained were measured in a similar manner to Example 1. The results are shown in Table 6.

COMPARATIVE EXAMPLE 11

The procedures of Example 26 were repeated except that the propylene-ethylene-vinylsilane terpolymer was omitted. The results are shown in Table 6.

EXAMPLE 27

The procedures of Example 26 were repeated except that white mica was not treated with 3-aminopropyltriethoxysilane in advance. The results are shown in Table 6.

EXAMPLE 28

The procedures of Example 26 were repeated except for the use of talc ("CT-8", trade name; product of Asada Milling Co., Ltd.) as an inorganic filler and potassium butoxide as a catalyst for forming silanol bonds. The results are shown in Table 6.

EXAMPLE 29

The procedures of Example 26 were repeated except for the use of propylene homopolymer ($\eta$: 1.62, II: 96.8%) as polypropylene. The results are shown in Table 6.

COMPARATIVE EXAMPLE 12

The procedures of Example 29 were repeated except that the propylene-vinylsilane copolymer was omitted. The results are shown in Table 6.

EXAMPLE 30

The procedures of Example 26 were repeated except that a propylene-ethylene-allylsilane terpolymer obtained in ethylene internal pressure of 3 kg/cm$^2$ ($\eta$: 1.62, ethylene content: 28 wt. %, allylsilane content: 0.8 mol %) was used instead of the propylene-ethylene-vinylsilane terpolymer. The results are shown in Table 6.

TABLE 6

| Run | Tensile yield strength | Flexural modulus | Izod impact strength 23° C. | Izod impact strength −10° C. |
|---|---|---|---|---|
| Ex. 26 | 370 | 17200 | 5.5 | 3.4 |
| Comp. Ex. 11 | 255 | 13000 | 3.8 | 2.8 |
| Ex. 27 | 365 | 18000 | 5.8 | 3.3 |
| Ex. 28 | 350 | 15500 | 5.1 | 3.1 |
| Ex. 29 | 380 | 18000 | — | — |
| Comp. Ex. 12 | 320 | 16000 | — | — |
| Ex. 30 | 360 | 16300 | 4.8 | 3.2 |

EXAMPLE 31

To 100 parts by weight of a propylene-ethylene block copolymer having an ethylene content of 7.5 wt. %, were added 5 parts by weight of the vinylsilane-propylene copolymer obtained in Example 1, 30 parts by weight of an inorganic filler which had been obtained in advance by treating white mica ("CLALITE MICA 300w", trade name; product of Kuraray Co., Ltd.) with 3-aminopropyltriethoxysilane in water-ethanol and then thoroughly drying the thus-treated white mica, and 0.01 part by weight of butyl tinlaurate. The resultant mixture was then kneaded and pelletized by an extruder. A pressed sheet of 2 mm thick was formed from the pellets. The pressed sheet was then treated for 10 hours in boiling water and dried. Its physical properties were measured in a manner similar to Example 1. The results are shown in Table 7.

COMPARATIVE EXAMPLE 1

The procedures of Example 31 were repeated except that the propylene-vinylsilane copolymer was omitted. The results are shown in Table 7.

EXAMPLE 32

The procedures of Example 31 were repeated except that white mica was not treated with 3-aminopropyltriethoxysilane in advance. The results are shown in Table 7.

EXAMPLE 33

The procedures of Example 31 were repeated except for the use of talc ("CT-8", trade name; product of Asada Milling Co., Ltd.) as an inorganic filler. The results are shown in Table 7.

EXAMPLE 34

The procedures of Example 31 were repeated except that propylene homopolymer ($\eta$: 1.62, II: 96.8%) was used as polypropylene and the pressed sheet was heated at 100° C. for 6 hours in diethylene glycol monoisobutyl ether instead of the treatment in boiling water. The results are shown in Table 7.

COMPARATIVE EXAMPLE 14

The procedures of Example 34 were repeated except that the propylene-vinylsilane copolymer was omitted. The results are shown in Table 7.

EXAMPLE 35

The procedures of Example 31 were repeated except that a propylene-ethylene-allylsilane terpolymer ($\eta$: 1.62, II: 90.3%, ethylene content: 2.3 wt. %, allylsilane content: 0.8 mol %) was used instead of the propylene-vinylsilane copolymer. The results are shown in Table 7.

TABLE 7

| Run | Tensile yield strength | Flexural modulus | Izod impact strength 20° C. | Izod impact strength −10° C. |
| --- | --- | --- | --- | --- |
| Ex. 31 | 360 | 17500 | 4.5 | 2.9 |
| Comp. Ex. 13 | 290 | 10000 | 7.0 | 3.5 |
| Ex. 32 | 375 | 19000 | 5.5 | 2.9 |
| Ex. 33 | 330 | 16000 | 4.6 | 2.7 |
| Ex. 34 | 385 | 18500 | — | — |
| Comp. Ex. 14 | 345 | 12000 | — | — |
| Ex. 35 | 350 | 17000 | 4.5 | 2.9 |

EXAMPLE 36

The sheet obtained in Example 1 was exposed 5 Mrad of electron radiation and its physical properties were then measured. The results are shown in Table 8.

EXAMPLE 37

The procedures of Example 36 were repeated except for the use of the sheet of Example 2. The results are shown in Table 8.

EXAMPLE 38

The procedures of Example 36 were repeated except for the use of the sheet of Example 3. The results are shown in Table 8.

EXAMPLE 39

The procedures of Example 36 were repeated except for the use of the sheet of Example 4. The results are shown in Table 8.

EXAMPLE 40

The procedures of Example 36 were repeated except for the use of the sheet of Example 5. The results are shown in Table 8.

TABLE 8

| Run | Tensile yield strength | Flexural modulus | Izod impact strength 23° C. | Izod impact strength −10° C. |
| --- | --- | --- | --- | --- |
| Ex. 36 | 365 | 18500 | 4.7 | 3.1 |
| Ex. 37 | 380 | 20500 | 4.8 | 3.2 |
| Ex. 38 | 350 | 18000 | 4.8 | 2.7 |
| Ex. 39 | 395 | 21500 | — | — |
| Ex. 40 | 355 | 18500 | 4.6 | 3.1 |

EXAMPLE 41

To 100 parts by weight of a propylene-ethylene block copolymer having an ethylene content of 7.5 wt. %, were added 3 parts by weight of the polymer obtained in Example 1 and 30 parts by weight of an inorganic filler which had been obtained in advance by treating white mica ("CLALITE MICA 300w", trade name; product of Kuraray Co., Ltd.) with 3-aminopropyltriethoxysilane in water and then thoroughly drying the thus-treated white mica. The resultant mixture was then kneaded and pelletized by an extruder. An injected sheet of 2 mm thick was formed from the pellets. The injected sheet was brush-coated with an acrylic paint "UNIROCK" (trade mark, product of Rock Paint Co., Ltd.). The thus-coated sheet was then placed for 30 minutes in an air oven of 60° C. so that the paint was baked and dried.

The above-prepared specimen was evaluated by the method prescribed under JIS K-5400, namely, the crosshatching test. Evaluation was made in terms of the number of remaining squares out of 100 squares. 100 squares remained.

COMPARATIVE EXAMPLE 15

The procedures of Example 41 were repeated except for the use of a graft polymer, which had been obtained by grafting maleic anhydride on polypropylene and had a maleic anhydride content of 12 wt. %, in place of the propylene-vinylsilane copolymer. 35 squares remained.

COMPARATIVE EXAMPLE 16

The procedures of Example 41 were repeated except for the omission of the propylene-vinylsilane copolymer. 25 squares remained.

COMPARATIVE EXAMPLE 17

The procedures of Example 41 were repeated except for the omission of mica. 45 squares remained.

EXAMPLE 42

The procedures of Example 41 were repeated except that white mica was used as was without treating it with 3-aminopropyltriethoxysilane in advance. 100 squares remained.

EXAMPLE 43

The procedures of Example 41 were repeated except for the use of talc ("CT-8", trade name; product of Asada Milling Co., Ltd.) as an inorganic filler. 100 squares remained.

EXAMPLE 44

The procedures of Example 43 were repeated except for the use of polyethylene, whose $\eta$ was 1.78, instead of the polypropylene. 100 squares remained.

COMPARATIVE EXAMPLE 18

The procedures of Example 44 were repeated except for the omission of the propylene-vinylsilane copolymer. 35 squares remained.

EXAMPLE 45

The procedures of Example 41 were repeated except for the use of a propylene-ethylene-allylsilane terpolymer ($\eta$: 1.62, II: 90.3%, ethylene content: 2.3 wt. %, allylsilane content: 0.8 mol %) in place of the propylene-vinylsilane copolymer. 100 squares remained.

COMPARATIVE EXAMPLE 19

The procedures of Example 45 were repeated except for the omission of white mica. 45 squares remained.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A polyolefin resin composition comprising (i) a copolymer which is prepared by copolymerizing an alkenylsilane represented by the formula:

$$H_2C=CH-(CH_2)_n-SiH_pR_{3-p}$$

wherein n is from 0 to 12, p is from 1 to 3, and R represents a $C_{1-12}$ hydrocarbon residual group and an olefin in the presence of a catalyst comprising a transition metal compound and an organometal compound, (ii) a polyolefin, and (iii) an inorganic filler.

2. The composition of claim 1, wherein said copolymer is prepared by graft-polymerizing an alkenylsilane on a polyolefin.

3. The polyolefin resin composition of claim 1, wherein said alkenylsilane is selected from the group consisting of vinylsilane, allylsilane, butenylsilane and pentenylsilane.

4. The polyolefin resin composition of claim 1, wherein said polyolefin is formed from an olefin selected from the group consisting of ethylene, propylene, butene-1, pentene, hexene-1, octene-1, 4-methylpentene-1 and 3-methylbutene-1.

5. The polyolefin resin composition of claim 1, wherein said transition metal compound is titanium halide and said organometal compound is an organoaluminum compound.

6. The polyolefin resin composition of claim 1, wherein the alkenylsilane is polymerized in an amount of from about 0.001 mol % to about 30 mol % of the copolymer.

7. The polyolefin resin composition of claim 6, wherein the alkenylsilane is polymerized in an amount of from 0.1 to about 10 mol % of the copolymer.

8. The polyolefin resin composition of claim 3, wherein the polyolefin is a crystalline polyolefin.

9. The polyolefin resin composition of claim 2, wherein the polyolefin is selected from the group consisting of homopolymers of ethylene, copolymers of ethylene, propylene, butene-1, 3-methylbutene-1 and 4-methylpentene-1.

10. The polyolefin resin composition of claim 1, wherein the proportion of said copolymer is from about 0.01 parts by weight to about 10 parts by weight per about 100 parts by weight of the polyolefin.

11. The polyolefin resin composition of claim 2, wherein the proportion of said copolymer is from about 0.01 part by weight to about 10 parts by weight per about 100 parts by weight of the polyolefin.

12. The polyolefin resin composition of claim 1, wherein said inorganic filler is selected from the group consisting of talc, kaolin, mica, calcium carbonate, calcium silicate, calcium sulfate, calcium sulfite or glass fibers.

13. The polyolefin resin composition of claim 1, wherein the proportion of the inorganic filler is from about 5 parts by weight to about 90 parts by weight per 100 parts by weight of the composition.

14. The polyolefin resin composition of claim 1 further comprising an additive selected from the group consisting of antioxidants, ultraviolet absorber compositions, lubricants, antistatic agents and nucleating agents.

15. A polyolefin resin composition prepared by treating the polyolefin resin composition of claim 1, under conditions such that silanol bonds are formed.

16. A process for improving the physical properties of the polyolefin resin composition of claim 1 comprising treating the polyolefin resin composition by a method selected from the group consisting of treating with water; treating with an alcohol selected from the group consisting of $C_{1-12}$ monohydric alcohols and $C_{1-12}$ polyhydric alcohols in the presence of a catalyst; and subjecting the composition to heat treatment in the presence of oxygen, to form silanol bonds.

17. The process of claim 16, wherein said catalyst is selected from the group consisting of an alkoxide of an alkali metal, an akloxide of an alkaline earth metal, an organic acid, a salt of an organic acid, an organic base and a noble metal catalyst and wherein said alcohol is selected from the group consisting of methanol, ethanol, propanol, butanol, pentanol, ethylene glycol and propylene glycol.

18. A polyolefin resin composition prepared by exposing the polyolefin resin composition of claim 1 to radiation.

19. A process for improving the physical properties of the polyolefin resin composition of claim 1 comprising exposing composition to radiation.

20. The process of claim 19 wherein said radiation is selected from the group consisting of $\alpha$ rays, $\beta$ rays, $\gamma$ rays, X rays, neutron radiation and electron radiation.

21. A polyolefin resin composition useful for molded articles to be surface-coated, comprising (i) a copolymer of an alkenylsilane represented by the formula:

$$H_2C=CH-(CH_2)_n-SiH_pR_{3-p}$$

wherein n is from 0 to 12, p is from 1 to 3, and R represents a $C_{1-12}$ hydrocarbon residual group and an olefin, and (ii) a polyolefin.

* * * * *

UNITED STATES PATENT AND TRADEMARK OFFICE
CERTIFICATE OF CORRECTION

PATENT NO. : 5,082,893

DATED : January 21, 1992

INVENTOR(S) : Asanuma et al.

It is certified that error appears in the above-identified patent and that said Letters Patent is hereby corrected as shown below:

On the Title page, item [30], Foreign Application Priority Data, change Priority Application Number from "1-24265" to --1-124265--.

Signed and Sealed this

Twentieth Day of July, 1993

Attest:

MICHAEL K. KIRK

*Attesting Officer*  Acting Commissioner of Patents and Trademarks